(12) United States Patent
Druckman et al.

(10) Patent No.: US 7,261,786 B2
(45) Date of Patent: Aug. 28, 2007

(54) FILAMENT WOUND CREW REST ENCLOSURE STRUCTURE

(75) Inventors: Ralph D Druckman, Marysville, WA (US); Karen L Hills, Everett, WA (US); Susan L Robinson, Everett, WA (US)

(73) Assignee: The Boeing Company, Chicago, IL (US)

( * ) Notice: Subject to any disclaimer, the term of this patent is extended or adjusted under 35 U.S.C. 154(b) by 376 days.

(21) Appl. No.: 10/943,034

(22) Filed: Sep. 16, 2004

(65) Prior Publication Data

US 2006/0054742 A1    Mar. 16, 2006

(51) Int. Cl.
*B65H 81/00*    (2006.01)
(52) U.S. Cl. .................. 156/173; 156/169; 156/175
(58) Field of Classification Search ................ 156/169, 156/173, 175, 171, 425, 428, 430
See application file for complete search history.

(56) References Cited

U.S. PATENT DOCUMENTS

| | | | |
|---|---|---|---|
| 2,081,529 A | 5/1937 | Canney | |
| 2,092,655 A | 9/1937 | Page, Jr. | |
| 3,295,279 A * | 1/1967 | Wilkins | 52/268 |
| 3,784,989 A | 1/1974 | LeGrand | |
| 3,846,727 A * | 11/1974 | Harmon | 337/246 |
| 5,115,999 A | 5/1992 | Buchsel et al. | |
| 5,362,345 A * | 11/1994 | Stettler et al. | 156/173 |
| 5,426,900 A * | 6/1995 | Springer | 52/79.1 |
| 5,784,836 A | 7/1998 | Ehrick | |
| 5,802,984 A * | 9/1998 | Thoman et al. | 105/404 |
| 5,855,174 A * | 1/1999 | Thoman et al. | 105/413 |
| 6,092,472 A * | 7/2000 | Thoman et al. | 105/404 |
| 6,237,872 B1 | 5/2001 | Bar-Levav | |
| 6,256,546 B1 | 7/2001 | Graham et al. | |
| 6,464,169 B1 | 10/2002 | Johnson et al. | |

* cited by examiner

*Primary Examiner*—Jeff H. Aftergut
(74) *Attorney, Agent, or Firm*—Harness, Dickey & Pierce, P.L.C.

(57) ABSTRACT

A mobile platform personnel berth unit and a method for creating the mobile platform personnel berth unit are provided. A male mandrel is created defining an inner mold line surface of the berth unit. The male mandrel is overlayed with one or more layers of filament strips. The filament layers are thermally cured to create an integrated structural member. The male mandrel is then removed from the structural member. The structural member is profile shaped to create a semi-finished berth unit having a top, a bottom and a pair of integral side panels. Additional entrance and back panels as well as access panels and connecting hardware are then added to complete the berth unit.

5 Claims, 11 Drawing Sheets

FILAMENT WOUND CREW REST ENCLOSURE STRUCTURE

FIELD OF THE INVENTION

The present invention relates in general to mobile platform crew rest berth units and more specifically to an aircraft crew rest enclosure structure and method of manufacture.

BACKGROUND OF THE INVENTION

Mobile platforms including aircraft, trains, ships, etc. often provide rest areas for crew or passengers when the vehicle is intended for operation over lengthy time periods. For simplicity, applications for aircraft crew rest berths are generally described herein. Crew rest berths are enclosures generally provided for an individual to rest or sleep in private, often having curtains or doors, electrical supply outlets, entertainment outlets, etc. Commercial aircraft in particular are required to provide crew rest spaces for aircraft which operate over extended periods of time. Common crew rest areas include bunks or berths, seats, and lavatories for crew use. Aircraft crew rests are often separately provided for flight crew members and for flight attendants.

The berth units are frequently built up using fiberglass/honeycomb panels that are joined to form a module. Separate top, bottom and side walls are prefabricated. The walls are connected using multiple brackets, fasteners and fittings. An upper and/or lower support plate is commonly used to support one or more berths to structure of the mobile platform. This construction/installation technique is labor intensive and produces berth units having multiple joints and undesirably high weight. In addition, sub-assembly of the units to the support plate(s) normally must take place on-site on the aircraft during construction, which provides additional delay in construction.

It is often a complex process to install crew rest berths on mobile platforms such as aircraft due to the size and weight of the berths, which can be about 300 pounds. This weight necessitates use of on-site special lifting/handling equipment. The structure to support a berth of this weight must also be reinforced or require multiple attachment points to carry not just the dead weight of the berth and support plates, but also the dynamic load of the berth due to berth/platform motion and aircraft motion. Access for installation of crew rest berths is also limited by items such as piping, structure, environmental control system ducting, flight control cabling, fire detection systems, stow-bin support structure and center stow-bins, and electrical cabling positioned adjacent to or passing through the crew rest areas. Installation of all these items needs to be coordinated during construction of the aircraft.

Crew rest berths have been positioned in the overhead volume (above the main cabin ceiling) of aircraft, which offers the potential for increased passenger or cargo capacity to the airline operator. Overhead positioned rest units do not displace main deck seats or cargo container volume in the lower lobe, and so increase the volume within the fuselage that is available for revenue service. Existing overhead positioned rest units, however, are excessively heavy as noted above and therefore reduce the payload potential of the aircraft.

A further disadvantage of existing crew rest berths is that assembly sequencing of these items is predetermined and therefore installation of crew rest berthing affects the overall construction schedule of the platform or aircraft. The additional structure and special equipment required to construct and install existing berths adds weight, complexity, and cost and therefore increases installation time, negatively affecting the construction schedule. Access space for the installing mechanics and any special equipment is also required. A crew rest berth design providing lower weight as well as faster and simpler installation is therefore desirable.

SUMMARY OF THE INVENTION

According to a preferred embodiment of the present invention, a method for creating a filament wound crew rest enclosure structure includes selecting a male mandrel defining an inner mold line surface of the berth unit. The male mandrel is overlayed with a plurality of adjoining filament strips. The filament strips in one or more layers are autoclave cured to create an integrated structural member. The male mandrel is then removed from the structural member. The structural member is profile shaped to permit installation of additional front and back panels as well as access panels and connecting hardware which complete the berth unit.

According to another preferred embodiment of the present invention, a mobile platform personnel berth unit includes a body having integrally joined perimeter walls defining a substantially hollow interior space. A wall thickness is formed from a plurality of wound filaments. In one preferred embodiment, a material of the body is a graphite composite. According to yet another preferred embodiment of the present invention, a core ply is inserted between layers of the filament strips to stiffen the wall and provide attachment points for additional equipment/fasteners.

A filament wound crew rest enclosure structure of the present invention provides several advantages. By integrally forming the walls, top and bottom surfaces of a crew rest enclosure, the number of connecting fittings is reduced. By using one or more filament wound layers of a graphite or graphite/polymeric material composite, a weight of the crew rest enclosure can be reduced to about 75 pounds or less, which permits two mechanics to install the crew rest enclosure by hand without the need for special handling equipment. By using an automated computer controlled tape laying machine, construction complexity is reduced compared to the known process of forming individual panels and joining the panels using a plurality of connectors and fasteners.

The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
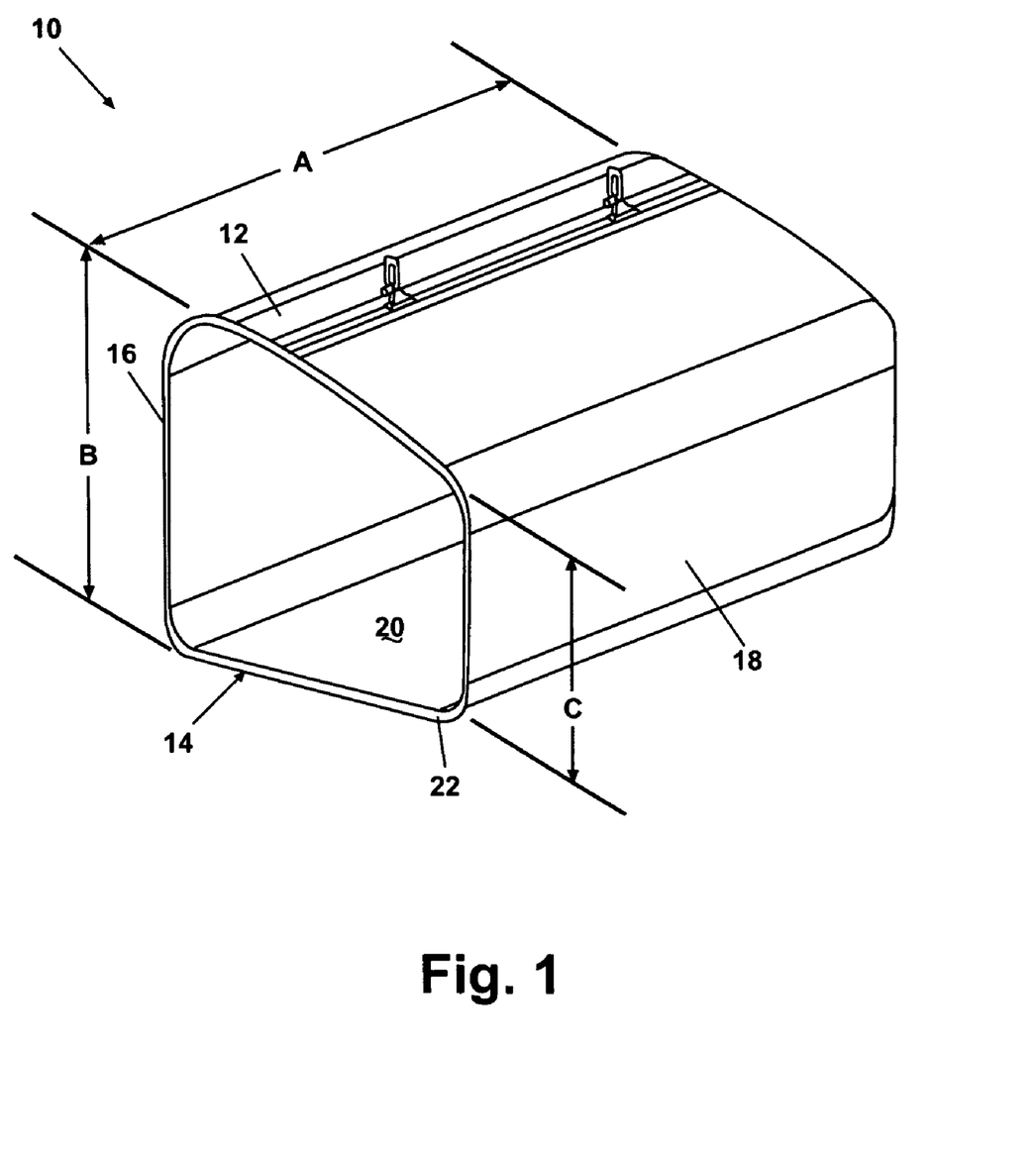
FIG. 1 is a perspective view of a filament wound crew rest enclosure structure according to a preferred embodiment of the present invention.

Referring generally to FIG. 1 and according to a preferred embodiment of the present invention a crew rest berth 10 includes an upper first wall 12, a lower second wall 14, a first side wall 16 and a second side wall 18. First and second side walls 16, 18 generally oppose each other and are shown in FIG. 1 configured in parallel to each other. The invention is not limited to the specific geometry shown in FIG. 1. A crew rest berth 10 of the present invention can be formed in any geometric shape suitable for application of the filament strips of the present invention. An end connection 22 is machined into or provided on at least one end of crew rest berth 10. End connections 22 are adapted to support end panels not shown in this view for clarity. A cavity 20 is formed substantially throughout crew rest berth 10 bounded by each of first and second walls 12, 14 and first and second side walls 16, 18 and the end panel(s).

Crew rest berth 10 includes a berth length "A", a major height "B" and a minor height "C". Dimensions "A", "B" and "C" are predetermined based on the geometry of the mobile platform in which crew rest berths 10 are installed. In a preferred embodiment of the present invention, berth length "A" is approximately 2.44 meters (8 feet). This length provides ample space for a person occupying crew rest berth 10 with additional room for necessary personal items.

Figure 2:
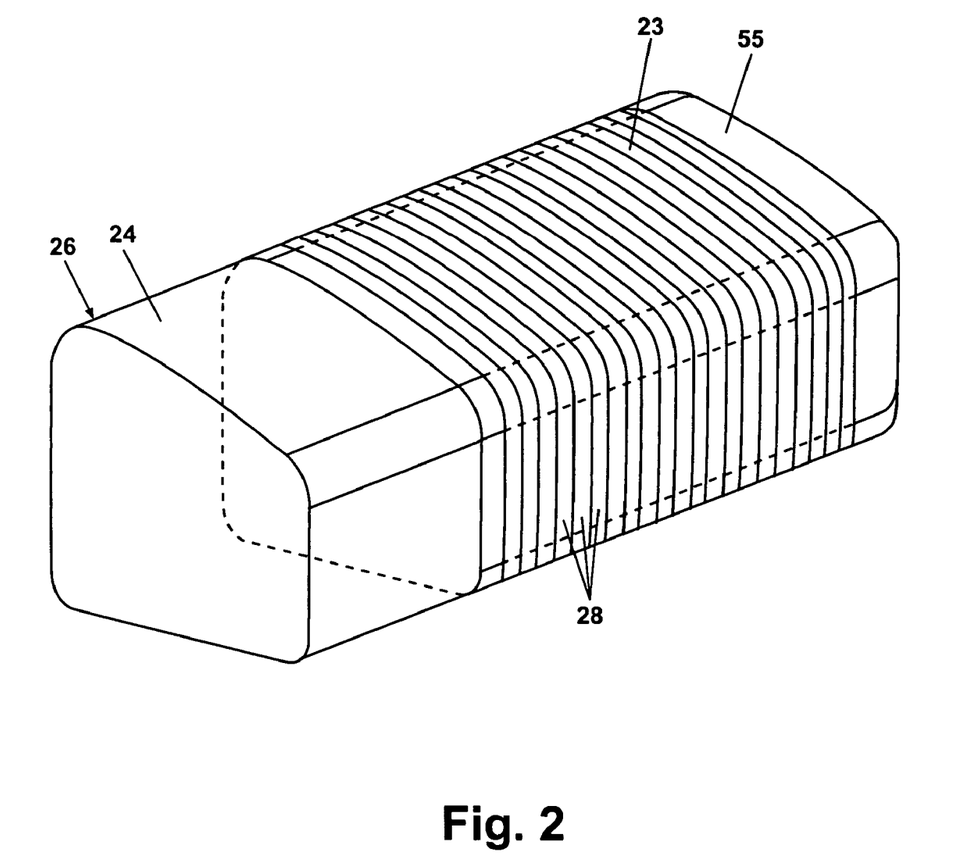
FIG. 2 is a perspective view similar to FIG. 1 further showing a male mandrel supporting an integrated structure for the crew rest berth of one preferred embodiment of the present invention.

Referring now to FIG. 2, an integrated structure 23 formed about an exemplary male mandrel 24 is shown. Integrated structure 23 is formed in one of a plurality of construction stages during creation of crew rest berth 10. Male mandrel 24 is constructed of a material structurally sufficient to retain the desired shape of crew rest berth 10 during this construction stage. For example, male mandrel 24 can be made from a metal material such as aluminum or a polymeric material. An inner mold line surface 26 of crew rest berth 10 is defined by a perimeter shape of male mandrel 24. Inner mold line surface 26 therefore defines a subsequent inner boundary of crew rest berth 10. Male mandrel 24 can extend beyond the ends of crew rest berth 10 as shown or can be sized to substantially equal the berth length "A" of crew rest berth 10. A plurality of filament windings 28 are wound about male mandrel 24 to form the wall thickness and the general shape of crew rest berth 10 in a process further detailed as follows.

Figure 3:
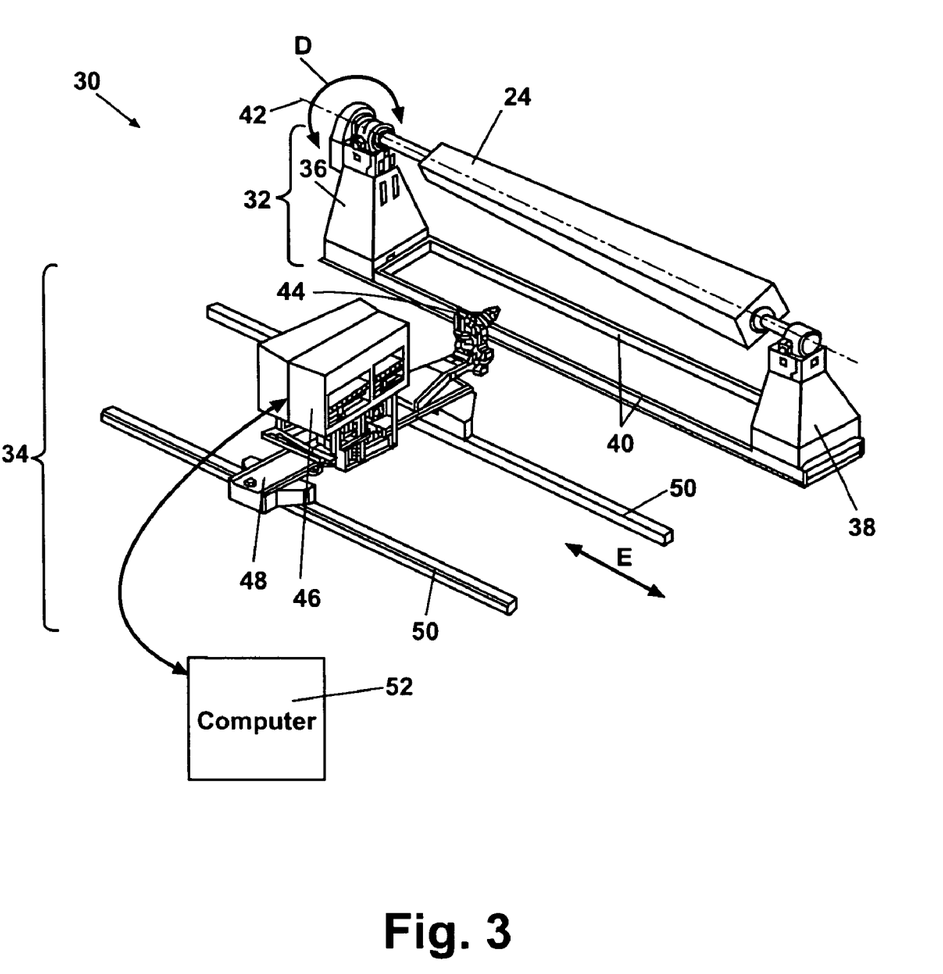
FIG. 3 is a perspective view of a filament application device used to wind individual filaments of material about the male mandrel of the present invention.

As best seen in FIG. 3, a filament application device 30 is provided to show one example of equipment that can be used to automatically install filament windings 28. In this example, filament application device 30 includes a mandrel support section 32 and a filament application section 34. Mandrel support section 32 further includes a head stock 36 and a tail stock 38 both supported by stock support legs 40. A mandrel longitudinal axis 42 is formed through male mandrel 24 when male mandrel 24 is rotatably supported between head stock 36 and tail stock 38. Male mandrel 24 can be rotated by head stock 36 in either of the directions of mandrel arc of rotation "D". Rotational torque for driving male mandrel 24 via head stock 36 is provided by, for example, an electric motor (not shown).

Filament application section 34 further includes an application head 44 which directs placement of the plurality of filament windings 28 about male mandrel 24. Application head 44 can travel in either of the directions of mandrel displacement arrows "E". As will be evident to a skilled practitioner, application head 44 is also displaceable either toward or away from male mandrel 24 and in either an upward or downward direction as viewed in FIG. 3.

Filament windings 28 are fed to application head 44 via a head driver 46 which also functions to displace application head 44 as required. Both application head 44 and head driver 46 are movably supported on a head support frame 48 which in turn is supported for motion in the direction of mandrel displacement arrows "E" by a pair of support legs 50.

A computer 52 which can be either locally or remotely positioned relative to application head 44 and head driver 46 is provided to permit preprogrammed operational movement of application head 44. One or more computer programs can be programmed into computer 52 for one or a plurality of geometries of male mandrel 24, varying thicknesses or widths of filament windings 28, varying quantities of layers of filament windings 28 and various patterns for applying filament windings 28. Computer 52 provides for automated assembly of crew rest berths 10 thus reducing manpower required for construction of crew rest berths 10. Individual filament windings 28 can also be applied manually to male mandrel 24 if the geometry of male mandrel 24 does not permit automatic application via application head 44.

Figure 4:
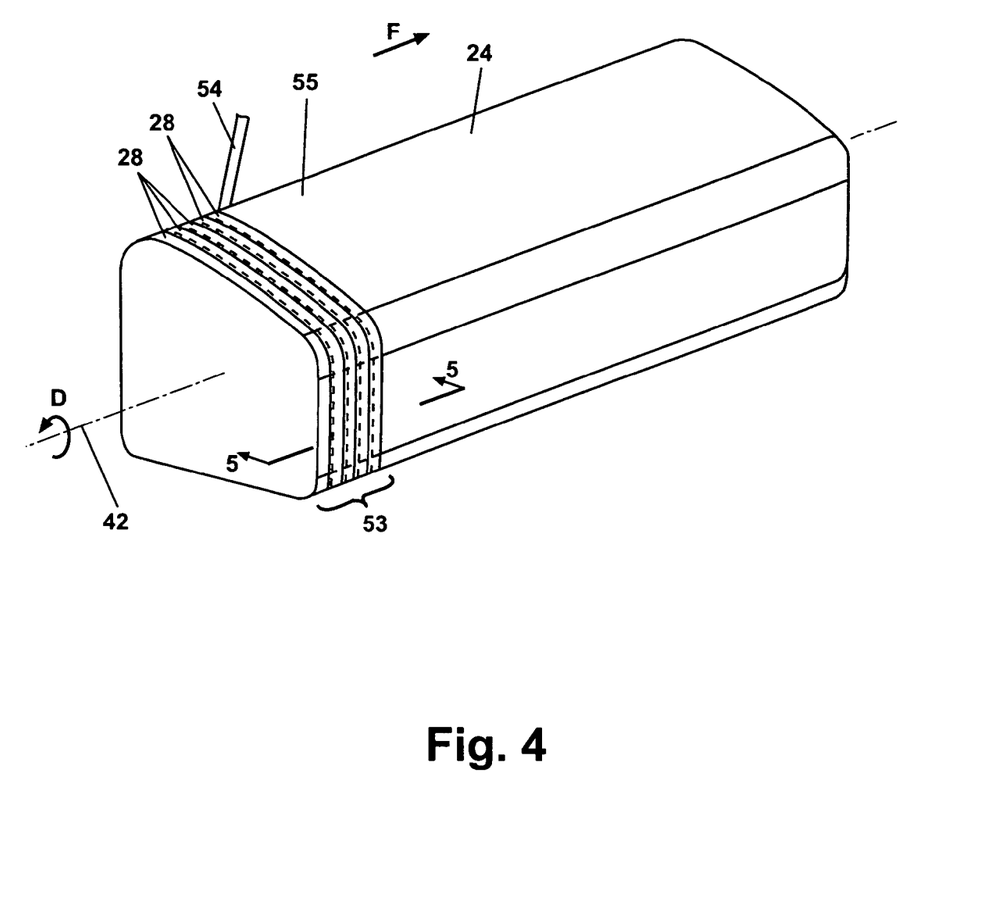
FIG. 4 is a perspective view of an exemplary male mandrel of the present invention having a partially completed plurality of filament strips wrapped thereon.
Figure 5:
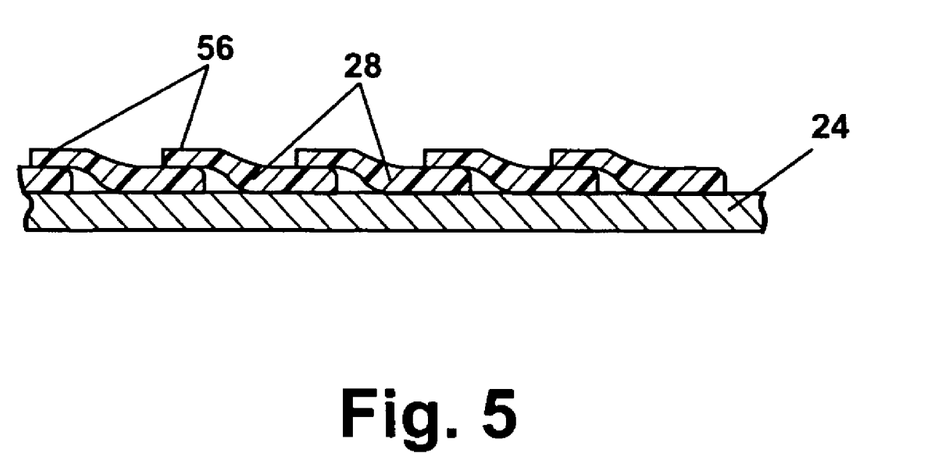
FIG. 5 is a partial cross-sectional view taken at Section 5-5 of FIG. 4.
Figure 6:
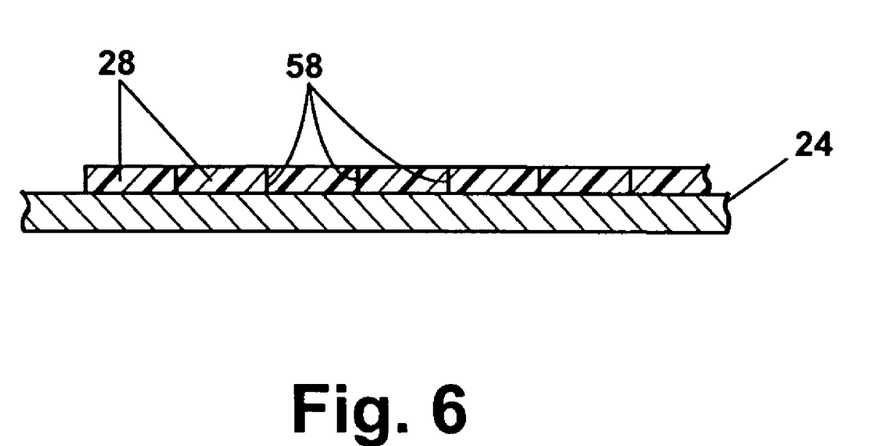
FIG. 6 is a partial cross-sectional view similar to FIG. 5 showing another preferred embodiment of the present invention.

Referring generally to FIG. 4, male mandrel 24 is shown having a portion of a first layer 53 of filament windings 28 applied thereon. A filament portion 54 supplied by application head 44 of filament application device 30 is applied to male mandrel 24 as male mandrel 24 rotates about mandrel longitudinal axis 42 in a first one of the arcs of rotation "D". It is desirable to install filament windings 28 as a continuous filament member for each wall thickness layer to reduce a total number of filament joints. Application head 44 is translated in the general direction of arrow "F" which is timed with the rotation speed of male mandrel 24 to apply one or more individual layers of abutting or overlapping filament windings 28. A release agent 55 can be applied to male mandrel 24 prior to or during application of filament windings 28 to subsequently aid in releasing integrated structure 23 from male mandrel 24.

Referring generally to FIGS. 5 through 8, a plurality of individual layers and layering techniques are shown for installation of filament windings 28. In one embodiment shown in FIG. 5, a single layer of overlapping filament windings 28 is provided by overlapping successive filament windings 28 using a plurality of overlapped portions 56. This embodiment provides for bonding between adjoining ones of the filament windings 28. In the embodiment shown in FIG. 6, filament windings 28 generally abut with each other, providing a plurality of abutting joints 58. This embodiment is particularly suited for applications having multiple layers of filament windings 28.

Figure 7:
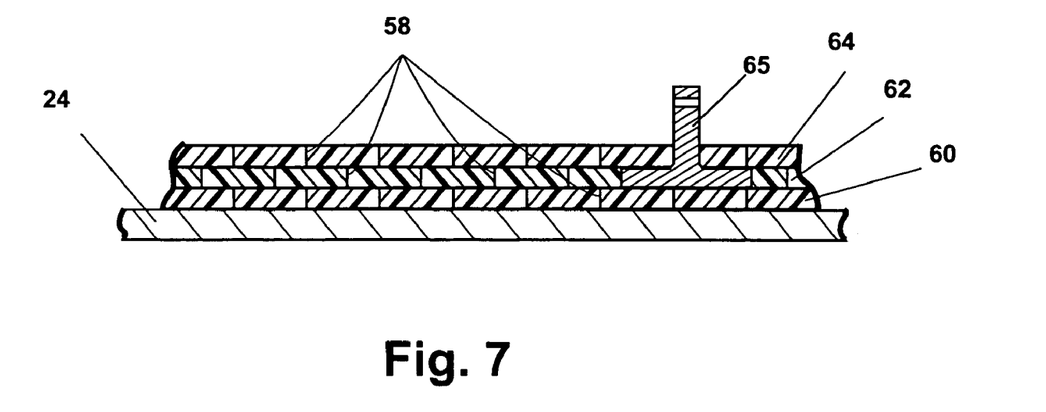
FIG. 7 is a partial cross-sectional view similar to FIG. 5 showing yet another preferred embodiment of the present invention.

As best seen in FIG. 7, a multiple layer embodiment of filament windings 28 is shown. A first layer or ply 60 is applied to male mandrel 24 as shown. A second ply 62 and a third ply 64 are then successively applied over first ply 60. In this embodiment, filament windings 28 are applied having a plurality of the abutting joints 58. Filament windings 28 of each ply can be aligned over successive plies, crossed, for example in a herring-bone arrangement, or perpendicularly arranged. Filament winding joints between layers of filament windings can be aligned or preferably staggered. Additional plies (not shown) can also be provided to achieve a desired stiffness or strength. FIG. 7 also shows an exemplary berth unit support fitting 65 which can be at least partially overlapped during the filament application process such that support fitting 65 is structurally connected to at least one of first, second and/or third plies 60, 62 and 64 with or without the use of additional fasteners (not shown).

Figure 8:
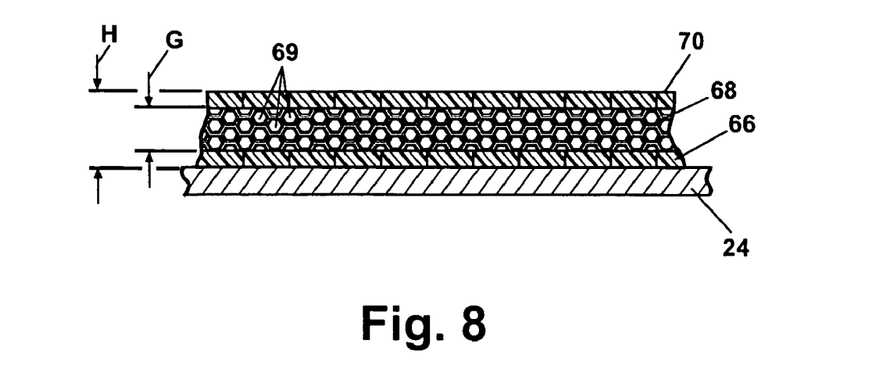
FIG. 8 is a partial cross-sectional view similar to FIG. 5 showing yet still another preferred embodiment of the present invention.

In a further embodiment shown in FIG. 8, a first or base ply 66 of filament windings 28 is applied to male mandrel 24. At least one core ply 68 is then applied over base ply 66. In a preferred embodiment of the present invention core ply 68 is a honeycomb layer of material having a plurality of honeycomb-shaped cells 69. Core ply 68 has a core ply thickness "G" which is built up of multiple layers of cells 69 or formed at least equal to a single layer thickness of filament windings 28, and preferably greater than a single layer thickness of filament windings 28. The purpose for core ply 68 is to increase a total ply thickness "H" to stiffen the configuration of crew rest berth 10 and also to at least locally provide additional thickness for further installation of items including fasteners and supported equipment within crew rest berth 10. It is desirable that core ply 68 be thicker (core ply thickness "G") than any one filament winding 28 but yield the same or a lower weight in an equivalent width of filament windings 28. An exemplary material for core ply 68 is NOMEX®, which is available from the DuPont Corporation. At least one overlying ply 70 is then applied over core ply 68.

After the desired number of layers of filament windings 28 and/or core ply 68 are applied to male mandrel 24, male mandrel 24 is then placed in an autoclave or oven. A temperature within the autoclave is raised to a sufficient temperature to bond and harden each of the layers and filament windings 28 into the general shape of integrated structure 23. Each filament winding 28 is pre-impregnated with an adhesive material which is heat activated at the elevated temperature within the autoclave to bond into integrated structure 23 (shown in FIG. 2). An exemplary autoclave temperature range is approximately 134-162° C. (300-350° F.) for curing phenolic material or phenolic containing adhesive materials, and length of cure time is variable from one to in excess of 10 hours. As will be obvious to the skilled practitioner, cure temperature and time can vary depending on the number of layers and thickness of filament windings 28.

Male mandrel 24 with cured windings 28 in the form of integrated structure 23 is then removed from the autoclave (not shown) and the male mandrel 24 is then removed from integrated structure 23. Male mandrel 24 can be removed in a number of ways, including providing male mandrel 24 in a plurality of pieces or segments which can be disassembled for removal from integrated structure 23. Male mandrel 24 can also be slightly tapered in a longitudinal direction such that the release agent 55 applied between male mandrel 24 and the first layer of filament windings 28 permits male mandrel 24 to be slid out of contact with integrated structure 23. Further techniques can also include cooling male mandrel 24 to shrink male mandrel 24 away from integrated structure 23 or longitudinally cutting integrated structure 23 to allow removal from male mandrel 24. Cutting integrated structure 23 to remove it from male mandrel 24 is less desirable because an additional joint results which must then be re-joined for example by adhesive, requiring additional application and cure times with possibly reduced structural integrity.

Figure 9:
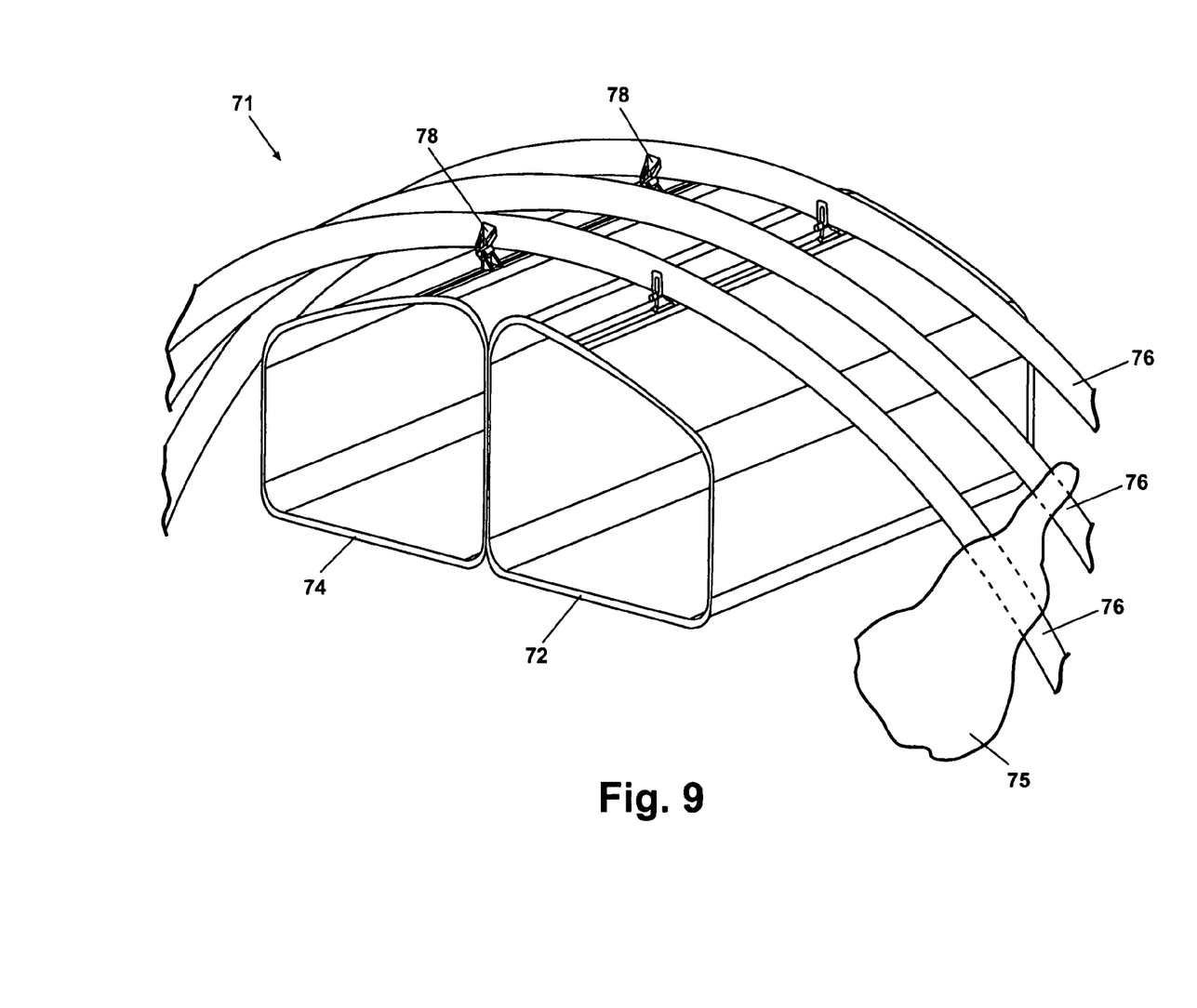
FIG. 9 is a perspective view of a berth assembly of the present invention having a pair of joined berths supported from structure of a mobile platform.

Referring now to FIG. 9, a pair of crew rest berths 10 including a first berth 72 and a second berth 74 are shown installed within an aircraft 75 and supported from a plurality of structural support members 76. In this embodiment, structural support members 76 reflect frames of aircraft 75. A berth assembly 71 formed by first and second berths 72, 74 can be supported by any type of structural support member 76 of aircraft 75. One of the advantages of the present invention includes that a reduced quantity of connecting fittings 78 can be used to support each crew rest berth 10 of berth assembly 71 to structural support members 76. Connecting fittings 78 (and similar connectable items) are preferably connected to crew rest berth 10 by overlapping at least a portion of connecting fittings 78 below or between layers of filament windings 28 during application of filament windings 28.

The reduced quantity of connecting fittings 78 is achievable due to the reduced weight of each crew rest berth 10 manufactured by the process described herein. In a preferred embodiment, a weight of each crew rest berth 10 is approximately 75 pounds or less which permits each crew rest berth 10 to be manually lifted into place to form berth assembly 71. By subsequently interlocking first and second berths 72, 74, berth assembly 71 is completed.

Figure 10:
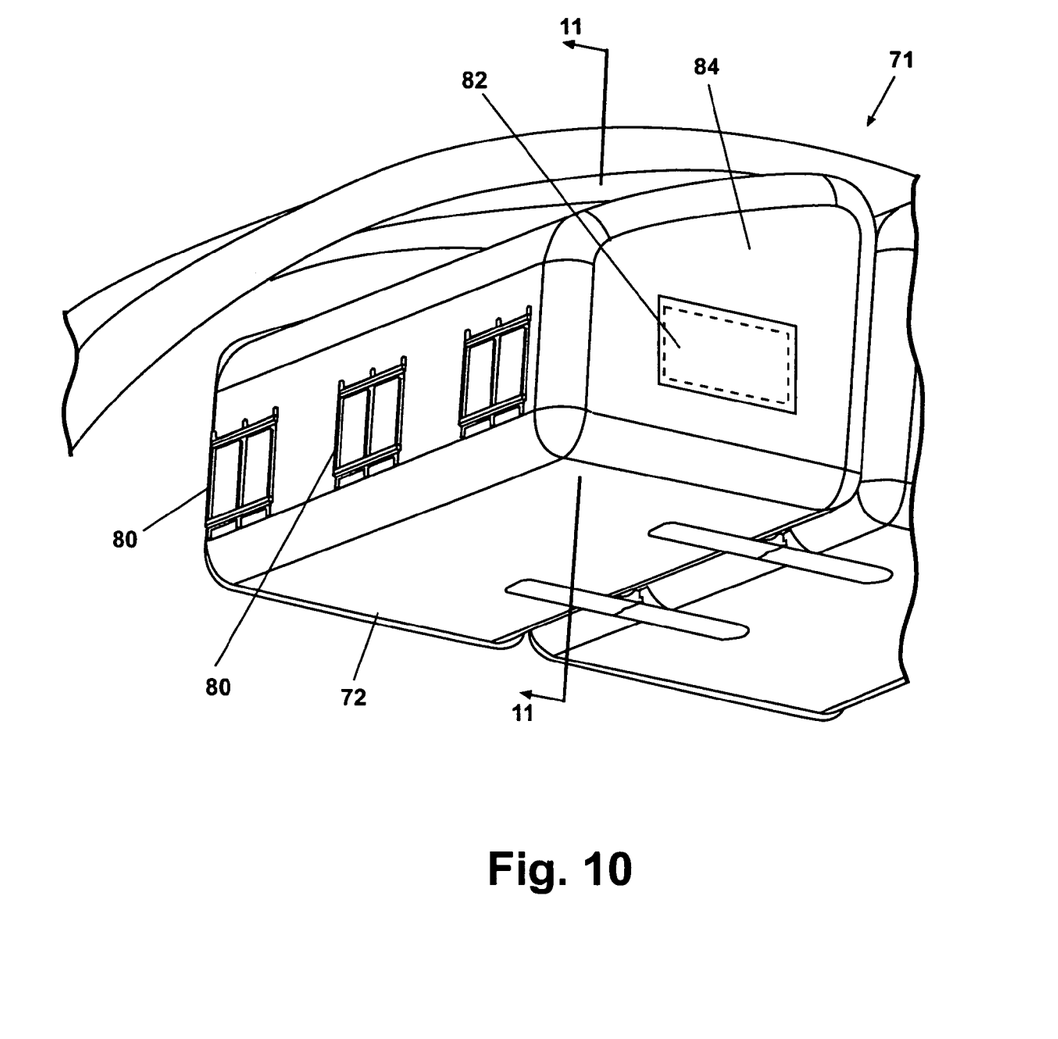
FIG. 10 is a perspective view generally showing a underside view looking forward of a single crew rest berth of the present invention.

Referring specifically to FIG. 10, an exemplary arrangement having additional items connectible to first berth 72 is shown. One or more component attachment structures 80 can be applied to any of the non-adjoining walls of berth assembly 71. Component attachment structures 80 permit the further attachment of items such as system piping, electrical cabling, ventilation ducting, etc., which are supported to one of the berths of berth assembly 71. Each crew rest berth 10 can also be provided with an access panel 82 which in the embodiment shown is connected to an end wall 84. As noted above, each of these items are preferably connected to crew rest berth 10 by overlaying at least a portion of the item with filament windings 28 during application of filament windings 28.

Figure 11:
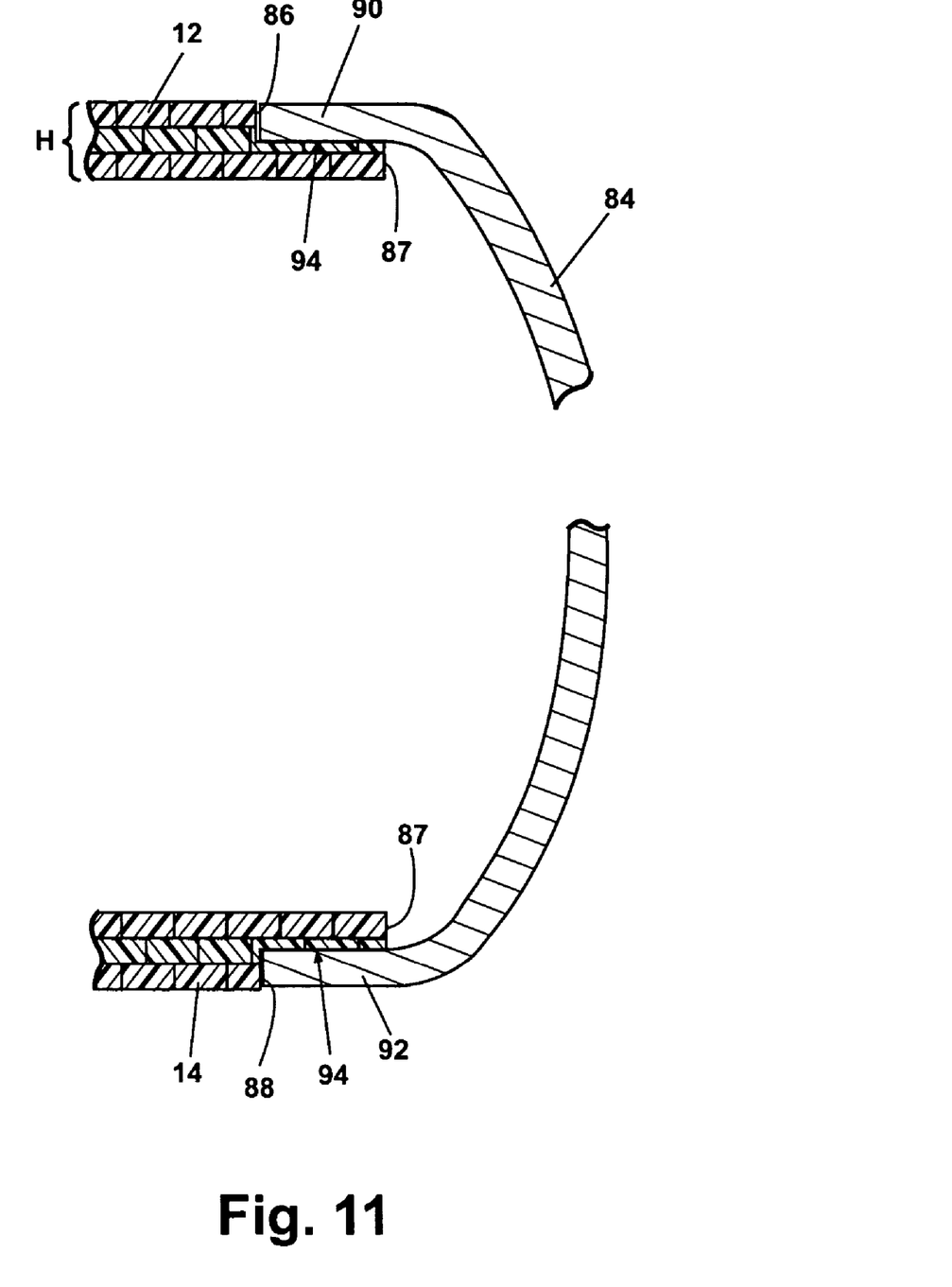
FIG. 11 is a cross sectional view taken at section 11-11 of FIG. 10.

Referring generally to FIG. 11, an exemplary connection is shown between end wall 84 and each of first and second walls 12, 14. A first connecting joint 86 is created adjacent a distal end 87 of crew rest berth 10. Similarly, a second connecting joint 88 is created adjacent distal end 87 of crew rest berth 10 of second wall 14. In one embodiment, each of first and second connecting joints 86, 88 are formed by removing a pre-determined amount of total ply thickness "H". A first connecting end 90 of end wall 84 and a second connecting end 92 of end wall 84 are overlapped with first and second connecting joints 86, 88, respectively. An adhesive 94 is applied at each junction between end wall 84 and the connecting joints of crew rest berth 10. End wall 84 is connected in a similar manner to each of first and second side walls 16, 18 of crew rest berth 10. These joints are redundant and therefore not shown for simplicity.

Connecting joints 86, 88 are preferably created using an automated machining process to minimize labor time. Connecting joints 86, 88 can also be formed by hand removal of the material. Additional embodiments, not shown, include having first connecting end 90 of end wall 84 and second connecting end 92 of end wall 84 sized to either overlap or slide within unmodified ends of crew rest berth 10 and adhesively sealed.

Figure 12:
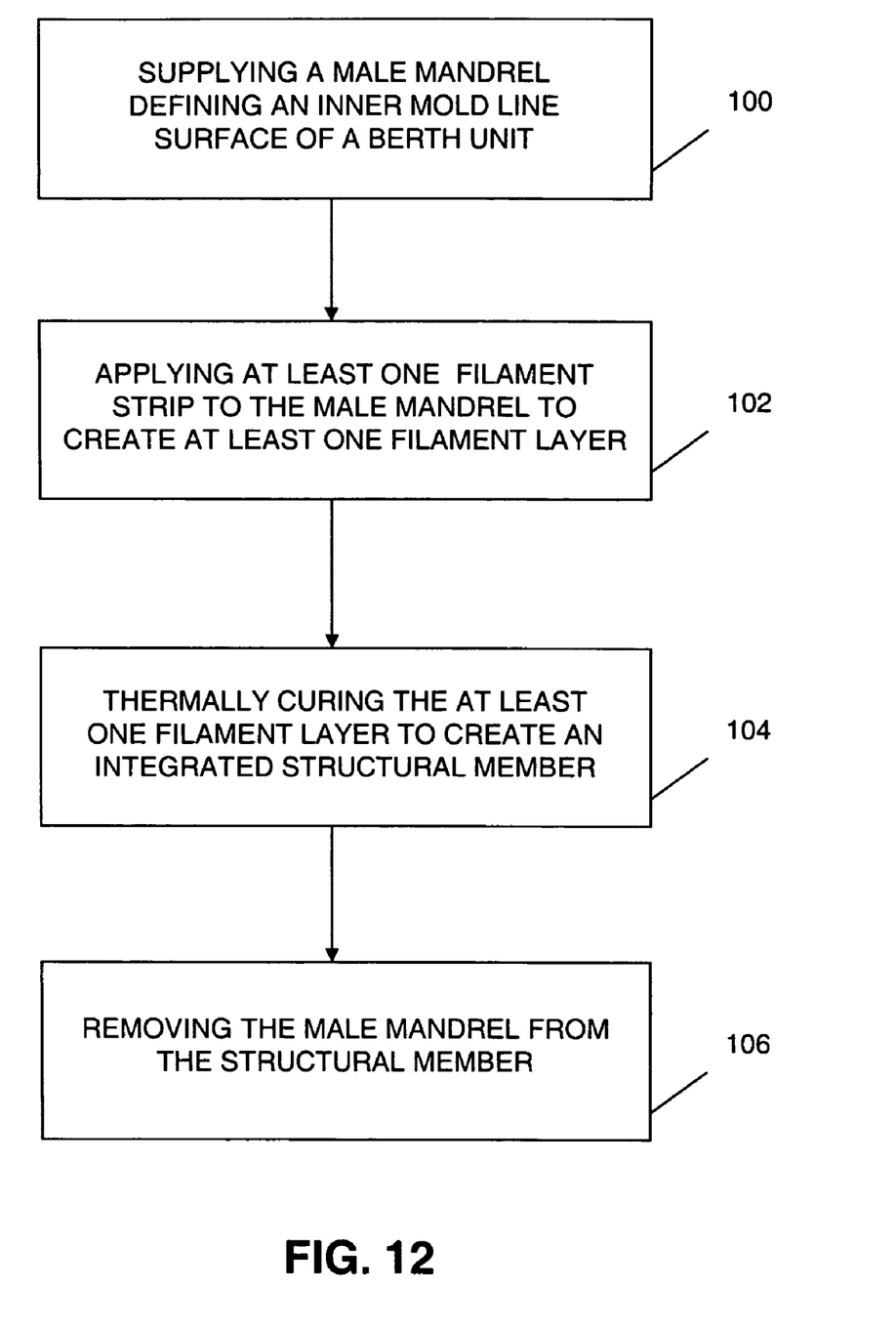
FIG. 12 is a flow diagram of exemplary operations for creating a mobile platform personnel berth of one embodiment of the present invention.

Referring to FIG. 12, the operations for creating a mobile platform personnel berth include the operations of: supplying a male mandrel defining an inner mold line surface of a berth unit (100); applying at least one filament strip to the male mandrel to create at least one filament layer (102); thermally curing the at least one filament layer to create an integrated structural member (104); and removing the male mandrel from the structural member (106).

Figure 13:
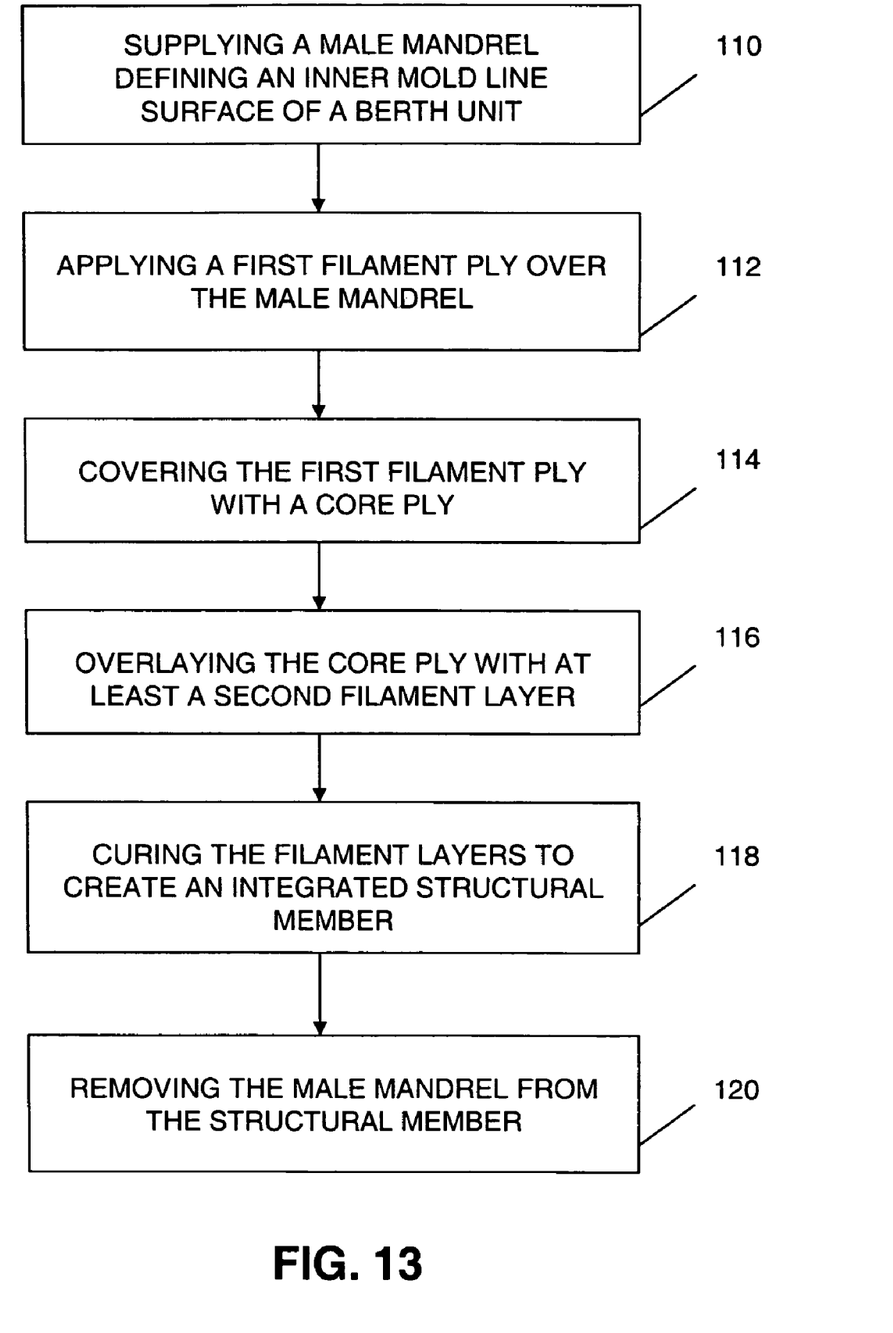
FIG. 13 is a flow diagram of exemplary operations for creating a mobile platform personnel berth of another embodiment of the present invention.

Referring to FIG. 13, according to another embodiment of the present invention, the operations for creating a mobile platform personnel berth include the operations of: creating a male mandrel defining an inner mold line surface of a berth unit (110); applying a first filament ply over the male mandrel (112); covering the first filament ply with a core ply (114); overlaying the core ply with at least a second filament layer (116); curing the filament layers to create an integrated structural member (118); and removing the male mandrel from the structural member (120).

Material for filament windings 28 is preferably predominantly a graphite (carbon) base material pre-impregnated with an adhesive portion. A phenolic adhesive is used in one preferred embodiment. A source for filament windings 28 in pre-impregnated form is Cytec Engineered Materials, Inc., of Tempe, Ariz. Use of graphite material provides high strength and reduced weight compared to common crew rest berths. At least one and preferably approximately three layers of filament windings 28 are used. Less than three or more than three layers can be used at the designer's discretion. The invention is not limited to the use of graphite material for filament windings 28 or to the number of filament winding or core ply layers. Other materials such as fiberglass and alternate polymeric materials or composite materials can be used. Phenolic material or phenolic material with one or more additives which meet flammability standards is one preferred material group for the adhesive used to bond the filament strips in applications such as aircraft interiors where flammability requirements are invoked.

A filament wound crew rest enclosure structure of the present invention provides several advantages. By integrally joining the walls, top and bottom surfaces of a crew rest enclosure, the number of connecting fittings is reduced. By using one or more filament wound layers of a graphite and/or graphite/polymeric material a weight of the crew rest enclosure can be reduced to about 75 pounds or less, which permits two mechanics to manually install the crew rest enclosure without the need for special handling equipment. By using an automated computer controlled tape laying machine, construction time is reduced compared to the known process of forming individual panels and manually joining the panels using a plurality of connectors and fasteners.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for creating a mobile platform personnel berth unit, comprising:
    creating a male mandrel defining an inner mold line surface of the berth unit;
    applying a first filament ply over the male mandrel;
    positioning a support fitting over the filament ply;
    overlapping a portion of the support fitting with at least a second filament ply;
    curing the first and second filament plies to create an integrated structural member having a non-overlapped portion of the support fitting extending away from the filament plies; and
    removing the male mandrel from the structural member.

2. The method of claim 1, further comprising profile shaping the structural member to create a semi-finished berth unit having a plurality of integrally formed panels including a top panel, a bottom panel and a pair of side panels.

3. The method of claim 2, further comprising attaching an end panel to the semi-finished berth unit.

4. The method of claim 1, further comprising creating at least one access panel in the berth unit.

5. The method of claim 1, further comprising successively winding at least one additional filament ply to operably form at least three layers of the filament plies.

* * * * *